Figure 1:
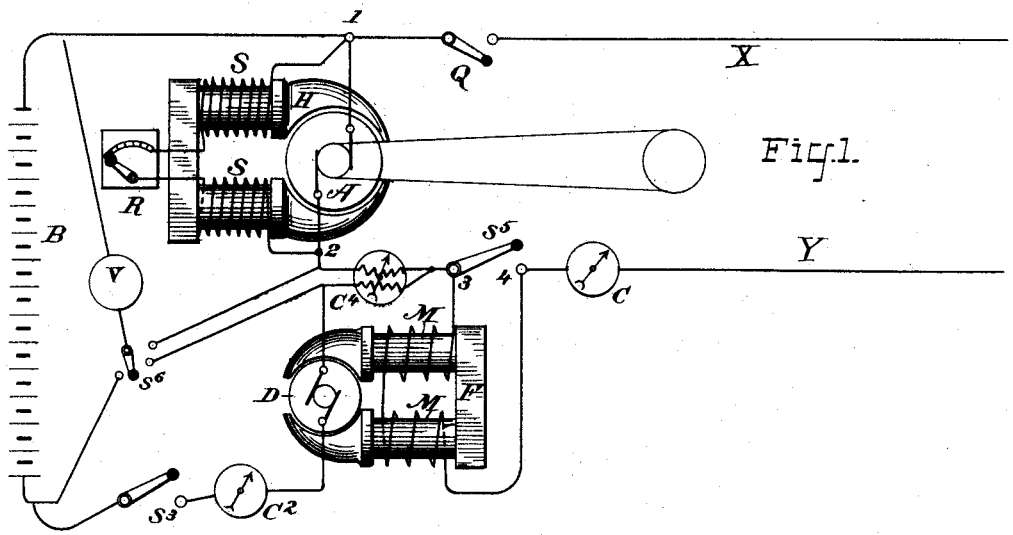

(No Model.)  4 Sheets—Sheet 1.

C. O. MAILLOUX.
REGULATION SYSTEM FOR ELECTRIC CIRCUITS.

No. 430,868.  Patented June 24, 1890.

ATTEST:  
J. Hurdly  
Wm. H. Capel

INVENTOR:  
Cyprien O. Mailloux  
By H. L. Townsend  
Attorney (No Model.) 4 Sheets—Sheet 2.

C. O. MAILLOUX.
REGULATION SYSTEM FOR ELECTRIC CIRCUITS.

No. 430,868. Patented June 24, 1890.

ATTEST:

INVENTOR:
Cyprien O. Mailloux
By H. L. Townsend
Attorney (No Model.)   4 Sheets—Sheet 3.
C. O. MAILLOUX.
REGULATION SYSTEM FOR ELECTRIC CIRCUITS.
No. 430,868. Patented June 24, 1890.
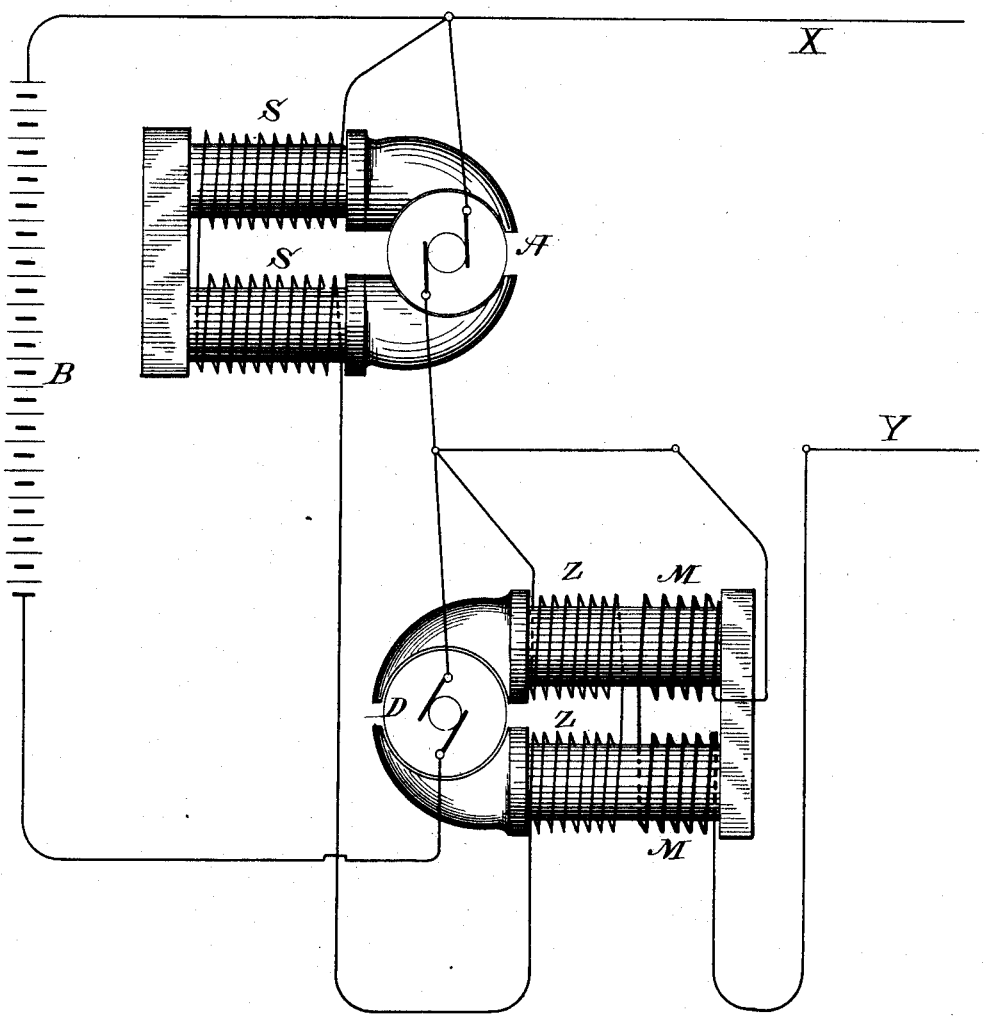
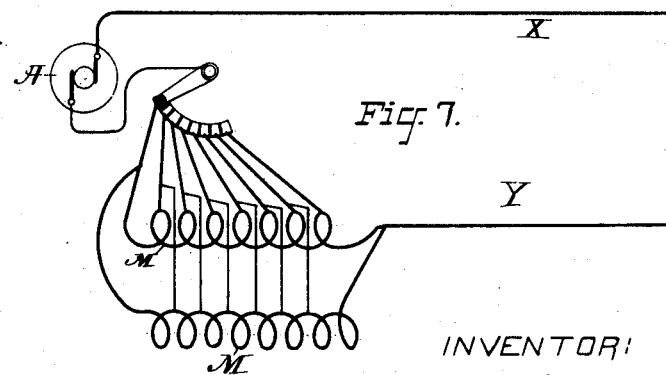
Fig. 5.
Fig. 7.
ATTEST:
INVENTOR:
Cyprien O. Mailloux
By H. L. Townsend
Attorney

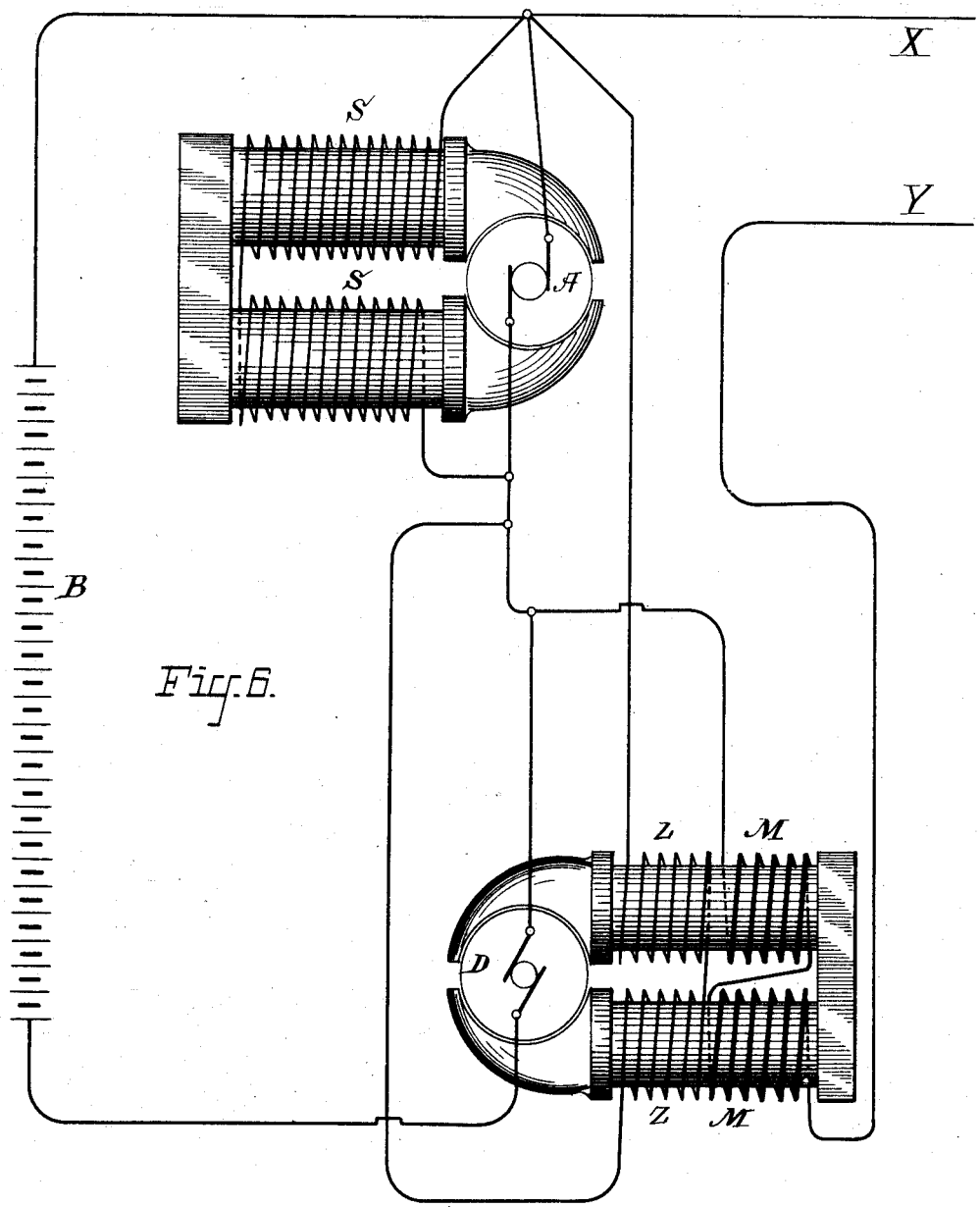

UNITED STATES PATENT OFFICE.

CYPRIEN O. MAILLOUX, OF BROOKLYN, NEW YORK.

REGULATION SYSTEM FOR ELECTRIC CIRCUITS.

SPECIFICATION forming part of Letters Patent No. 430,868, dated June 24, 1890.

Application filed August 29, 1889. Serial No. 322,334. (No model.)

*To all whom it may concern:*

Be it known that I, CYPRIEN O. MAILLOUX, a citizen of the United States, and a resident of Brooklyn, in the county of Kings and State of New York, have invented a certain new and useful Regulation System for Electric-Railway and Electric-Power Circuits, of which the following is a specification.

My invention relates generally to the use of storage-batteries as means for supplying a current to compensate for fluctuations of electrical condition on an electric circuit or for other purposes.

My invention relates to the regulation of the compensating action of a storage-battery when applied to compensate for fluctuations of electrical condition of a working-circuit; and it consists, essentially, in re-enforcing such battery by a supplemental generator at the time of discharge and regulating the action of the re-enforcing agent automatically by the electric condition of the working-circuit.

My invention is especially applicable to electric-power circuits in which great changes of load or electrical condition are liable to take place.

Practical experience with circuits supplying electric energy for running motors, either stationary or locomotive, shows that in some cases the energy called for on the circuit fluctuates with great suddenness and within very wide limits. This is more especially the case on street-railway circuits, where the load may jump instantly from nothing up to the maximum capacity of the plant. These sudden and severe fluctuations cause great strains in the engine, dynamo, and the entire machinery, and materially reduce its life and durability. At the same time there is also produced a fluctuation in the potential difference at the terminals of the line, owing to the fact that the most perfect engines cannot govern quickly nor accurately enough to compass such rapid and extensive variations, even when such expedients as compound winding, separate excitation, &c., are employed, for these all depend upon the speed being maintained constant. It is also demonstratable that such a mode of working is not economical, for it involves a larger engine and dynamo than would be used were it not for these fluctuations, and the extreme variations of cut-off during these fluctuations are not conducive to economy in the use of steam. Moreover, it is found impossible to operate successfully with slower-acting engines, and high-speed engines must be used, although it is recognized that they are not as economical as the slower engines of the most modern types.

My invention has for its principal object to overcome these difficulties and to make the work of the generating machinery more uniform in spite of any fluctuations on the working-circuit. To this particular end I provide a storage-battery in which energy shall be stored when the load is light and be made available in the working-circuit, in connection with a supplemental generator, when the load is heavy, so that the extra load may actually be taken care of without causing any material increase in the output of the engine and generating machinery.

The supplemental generator is preferably a dynamo whose amature is in the branch with the compensating storage-battery. This generator is run during operation with a polarity such that its electro-motive force shall oppose that of the charging-current and shall assist the discharge-current. The power of the supplemental generator is automatically controlled by the fluctuations of the electrical condition on the main circuit, in which compensation is to be effected. This I propose to accomplish by means of an electric coil, which I term the "regulating or controlling coil," or by other electro-responsive device made to control the action of the dynamo or other supplemental generator in any of the ways known to electricians. A convenient way is to make such regulating-coil the field-coil for the dynamo, thus varying the field of the machine automatically. It might be made to shift the brushes of the dynamo by any means, so as to vary the electro-motive force to operate or produce a controlling action in other ways and directly or indirectly through other devices, the coil in any case being electrically connected into the main circuit, so that fluctuations or changes of electrical condition of such circuit would be felt in the coil.

In connection with the regulating-coil, whether the same be a field-coil or otherwise employed, I prefer to use an opposing or differential coil acting as hereinafter described, so that at a critical point, as hereinafter described, the main regulating-coil may operate without opposition in a manner to cause the supplemental generator to operate with its full power. Preferably I control the action of the opposing or differential coil by the action of a relay device. The storage-battery is connected to the mains in the usual way to operate as a compensating influence and is charged, preferably, from the main dynamo.

I am aware that storage-batteries have been heretofore used with shunt and other dynamos to effect partial compensation. Owing, however, to the fact that the electro-motive force of the discharge is so much lower than that of the charge, the compensation effected has covered only the comparatively minute fluctuations.

My invention overcomes this deficiency, as will hereinafter appear.

My invention consists, also, in the methods of and apparatus for accomplishing the special and general objects of my invention, which are more particularly specified in the claims.

Figure 2:
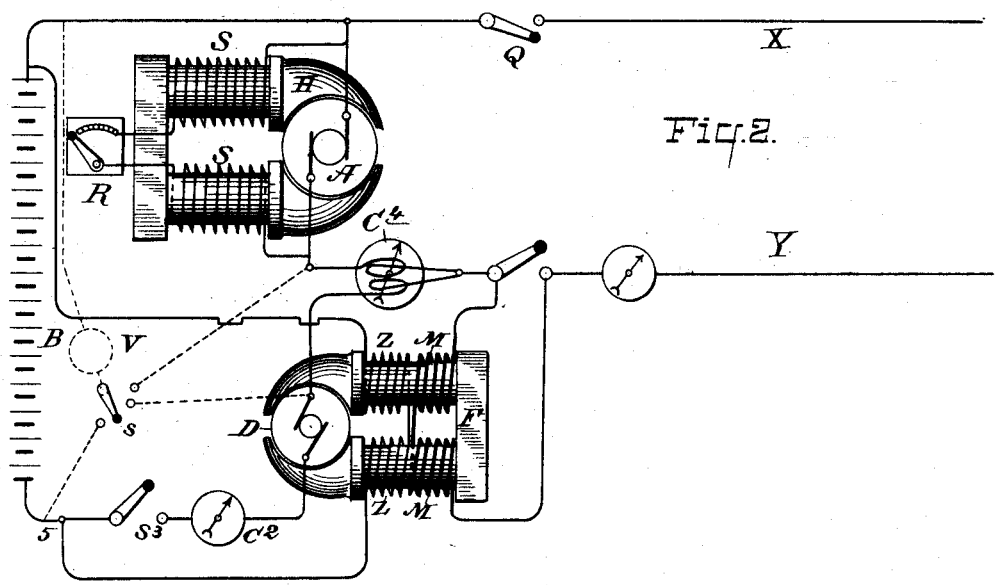
Figure 3:
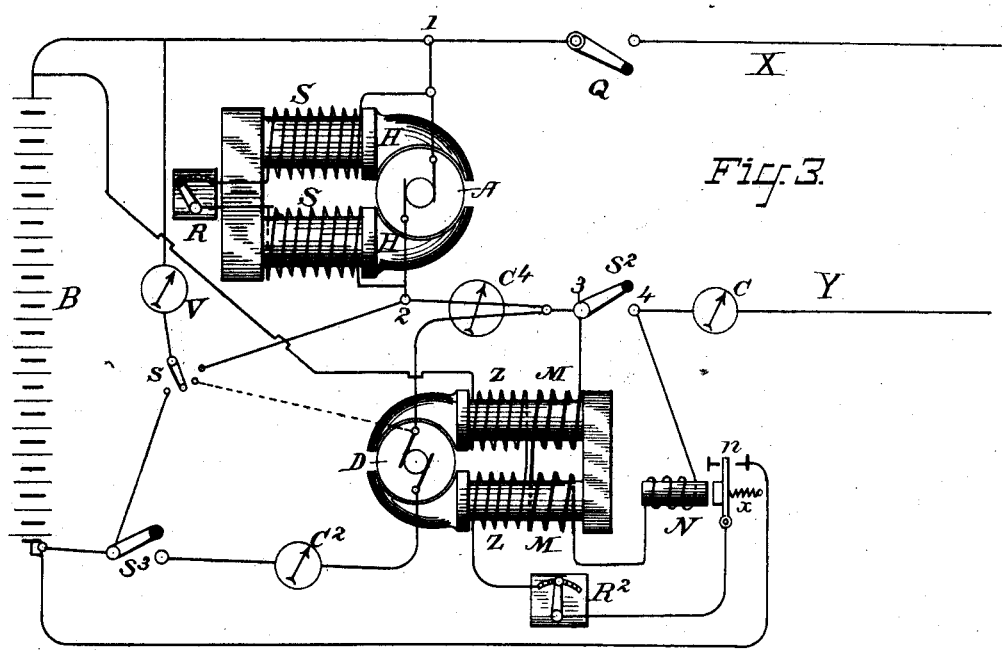
Figure 4:
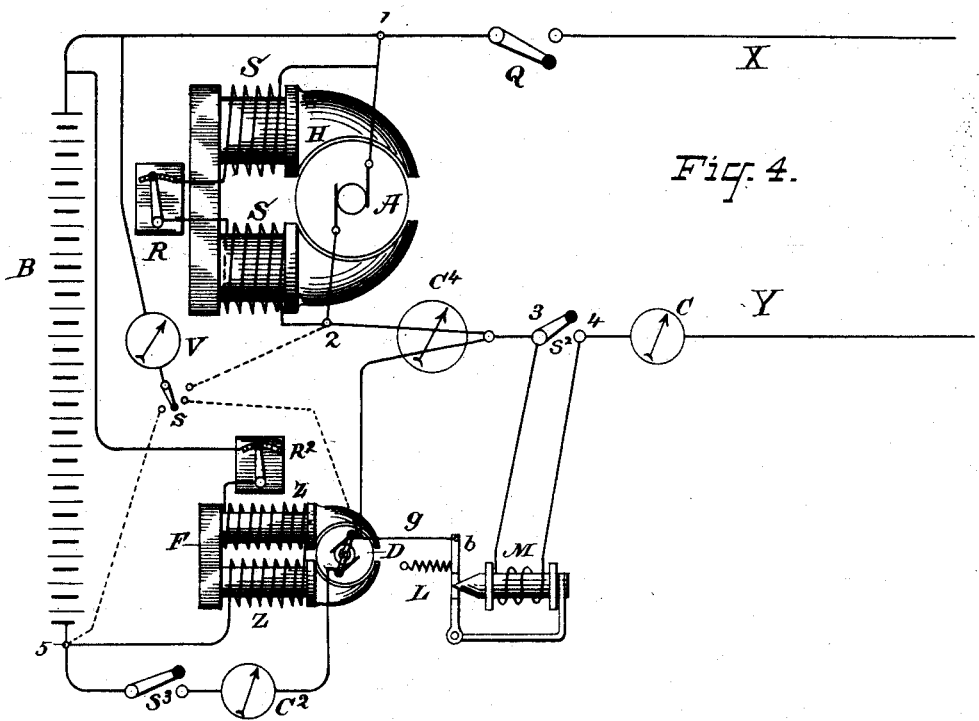

In the accompanying drawings, Figure 1 is a general diagram of one arrangement of circuits and apparatus embodying my invention. Figs. 2, 3, and 4 are diagrams illustrating modifications of the controlling devices for regulating the power of the supplemental or re-enforcing generator. Figs. 5 and 6 are diagrams showing modifications of the connections of the field-coils of the supplemental dynamo. Fig. 7 shows a detail of adjustment.

A is the armature of the main or generating dynamo, which supplies the energy to the main line or circuit leads X Y directly or indirectly. In the present instance the lines X Y are supposed to be constant-potential lines supplying translating devices of a character such, for instance, as railway-motors in multiple. Suitable switches Q may be introduced into one or both line-connections for opening or closing the line-circuit.

H is the field-magnet of the dynamo, which dynamo is preferably of the shunt-wound type, and is provided with a resistance-box R of any proper character for varying the resistance in the circuit of the shunt field-coils S S.

B indicates a series or multiple series of secondary-battery cells in a branch or circuit connected to the terminals of the armature A, as indicated.

D is a supplemental or re-enforcing generator in the circuit with the batteries, and here shown as consisting of the armature of a dynamo-generator, which may be of very small size and capacity as compared with the main generator. The generator D is arranged so that its electro-motive force will add itself to that of the storage-battery on discharge of such battery. It is obvious, therefore, that the electro-motive force of the armature D will, when it is running, oppose the current from A in the operation of charging the battery. A switch $S^3$ and amperometer $C^2$ are also shown interposed in this circuit.

At $C^4$ I have shown a differential amperometer which may sometimes be used with convenience. Another amperometer C is also shown interposed in the main or working circuit X X. In practice any or all of these instruments may be dispensed with, as they are not of vital importance to the operation of my system. The same also applies to the voltmeter V, which I have shown here with a switch $S^6$, whereby it may be used for a variety of indications, as will readily be understood from the drawings.

A regulating-coil which governs the electro-motive force of the generator D is indicated at M. In this particular instance it is formed as the field-magnet exciting-coil for the generator-field, and it is made responsive to fluctuations of electric condition on the circuit X Y by including it directly in such circuit, as indicated. The coils M, when included in the main-line circuit, as here shown, should consist of a few turns of large wire, inasmuch as the entire working current or currents sent over the line must pass through them. A switch $S^5$ may sometimes be conveniently used for throwing the coils out of operation.

In the operation of the system both of the armatures A and D are rotated at their respective speeds by the application of motive power either from the same or different sources. The number of cells in the series B is proportioned in accordance with the potential used, as are also the windings of the armature D, as well as the speed of the small dynamo F. The field-winding M M must be proportioned with reference to the current beyond which the batteries are to assist in compassing fluctuations. For a five-hundred-volt circuit the series B would comprise about two hundred and twenty-five cells of the Planté type. The exact number would be varied to suit the conditions, as will be more clearly seen farther on.

As long as there is no current on the circuit X Y the magnetic field of the generator-armature D is inert and does not influence the armature D to any material extent. In this condition, however, the electro-motive force of the armature A is sufficient to send current through the series of cells B, including the rotating armature D, which acts like a resistance. This current will serve to charge the cells of the series B. As soon as a current is sent over the working-circuit the magnetic field M M becomes excited in proportion to the amount of current. The relations are arranged in such a way that the electro-motive force generated by the armature D in virtue of this magnetic field will be opposed or contrary to that of the dynamo. It follows, therefore, that the charging-current through series B will be reduced, because the available electro-motive force is now equal to only the difference between that of A and that of D. The conditions are so arranged and adjusted that when a certain value of the current in the working-circuit is reached the electro-motive force of the armature D will have increased sufficiently to neutralize the charging-current completely. In this condition the armature D adds enough counter electro-motive force to that of the battery to make it equal to that of the dynamo-armature A. At first it would seem as if at this moment the batteries ought to begin to discharge into the line jointly with the armature A, thereby partly relieving the latter; but it must be remembered that the cells have a lower electro-motive force during discharge than they require to charge them; hence it is only a little above this limiting current that the cells will really begin to assist the main dynamo—that is to say, at a point where the armature D is generating and adding to the series B a little more electro-motive force than was enough to balance this "compensating" circuit against the armature A. Now it will readily be seen that the higher the working-current on X Y rises above this point the stronger the compensating circuit becomes relatively to the armature A. If the saturating-point of the field-cores F is made sufficiently remote, the compensating circuit may be made to exceed the armature A in electro-motive force by a considerable proportion at the extreme or maximum current value reached in the fluctuations; hence it is clear that the more severe the fluctuation the greater the portion of it that will be taken care of by the discharge from the compensating circuit. Moreover, the slight reduction of electro-motive force due to the slowing of the engine under sudden load will help the dynamo to relieve itself of a portion of the burden at the expense of the compensating circuit. In this way it might be an advantage instead of a disadvantage to have a slow-governing engine as the source of motive power.

It is not necessary that the cells of the series B should have a very great current capacity. The fluctuations are usually quite momentary and seldom, if ever, extend beyond a period of a few minutes; hence the series of batteries B could compass a very great fluctuation with a very low capacity. Thus with cells of as low as ten-ampère-hours capacity a compensating current of sixty ampères could be maintained for ten minutes, and one hundred ampères for about five minutes. For this application cells prepared according to the method discovered by M. Gaston Planté would be adaptable even without having had much preliminary "formation." Cells of this type have the great advantage of being able to withstand severe rates of charge and discharge without injury.

It is noteworthy that in effecting the above compensation, whereby the compensating circuit takes care of virtually all the extra load, the energy required by the small dynamo must be abstracted from the prime mover. This amount of energy is insignificant, however, as compared with the total extra load. Thus on a five-hundred-volt circuit the small dynamo would not require to raise the potential of the compensating circuit at any time above sixty volts. If now the normal current is fifty ampères and jumps up to one hundred and twenty-five, then, assuming that the battery and small dynamo together take up the entire extra load of seventy-five ampères, the proportion furnished by the small dynamo would be only about (sixty by seventy-five) four thousand five hundred watts, while the battery would furnish about (four hundred and fifty by seventy-five) thirty-three thousand seven hundred and fifty watts. Thus the prime mover furnishing the motive power would have an additional load of less than ten horse-power during a fluctuation that would otherwise increase the load by over fifty horse-power.

In Fig. 2 I have illustrated the application of a differential or opposing coil which normally opposes the action of the regulator-coil when the latter consists of a field-magnet coil. The coils Z Z are the opposing coils referred to, and are formed as a shunt field-magnet coil, which is connected to the terminals of the battery B. It could also be connected to the terminals of the main-dynamo armature, as shown in Fig. 6, or in series with the coils S of the main dynamo, as shown in Fig. 5, or might be otherwise supplied with electric energy, as is well understood in the art, so that it would tend normally to cut down the field magnetism. The manner of regulating and determining the current in such coil would obviously be modified under different circumstances. The advantage of this opposing coil acting in opposition to the main regulating-coil is that with all current below a given value the action of the coils Z may be allowed to predominate and cause the magnet D to generate electro-motive force that would help instead of oppose the electro-motive force of the main dynamo in charging the cells B.

I do not limit myself to the application of the opposing coil to the regulating-coil when the latter is employed as a field-magnet coil and design using the principle, as shown in this and other figures, in connection with a regulating-coil or electro-responsive device, however applied, to varying or controlling the electro-motive force of the supplemental re-enforcing generator.

The action of the coil Z might be controlled by a relay device, as indicated in Fig. 3, where a relay M of very few turns is included in the main-line circuit, so as to be responsive to changes of electrical condition therein, and is made, through suitable contacts, to throw the coils Z out of action when the relay-magnet requires a determining power sufficient to overcome the action of the spring or other retractor.

The tension of the spring X is adjusted so that connection at $n$ may be broken whenever the main or working current exceeds a given value, thereby throwing the coil Z out of action. By this arrangement when the shunt-coil Z and main coil M M reach a point where their effects balance one another any slight increase may cause the shunt to be cut out, so that the magnetic field may be excited only by the coil M, and the electro-motive force of the small dynamo may be instantly largely increased. It is not necessary that this point should correspond to the same current value as that where the extra load begins. It may be set above or below this value at whatever point found most desirable. A shunt-rheostat $R^2$ is provided to facilitate the adjustment.

In Fig. 4 the variation of electro-motive force of the supplemental dynamo is effected by means of a regulator-coil or electro-responsive device operating in another well-known manner. In this case the magnetic field is constant, or nearly so, the coils Z Z being connected as a shunt at the terminals of the battery series B. The connections could also evidently be made at the terminals of the main dynamo, as before explained. A rheostat $R^2$ is provided, whereby the current can be adjusted so as to vary the strength of the magnetic field.

The electro-motive force is varied by shifting the brushes of the dynamo. This may be accomplished in many ways, one of which is here shown. The coil M is the coil of a main-circuit magnet, whose armature-lever L is articulated with a rod S, connected with the rocker-arm carrying the brush-holders. Normally the brushes are in the "worst" position—*i. e.*, where the electro-motive force generated will be a minimum. As the main-line current increases, the armature will be attracted more and more and the brushes will be gradually moved toward the proper neutral point; hence the electro-motive force will gradually rise. In all other essential respects the apparatus will operate exactly as in Fig. 1, and the results obtained will be identical. Other means will readily occur to electricians by which the electro-motive force of the supplemental re-enforcing generator may be automatically varied. In any case it is only necessary to connect to the mains the proper regulating-coil or other electro-responsive device, which shall operate directly or indirectly as the means for following or controlling such electro-motive force.

While I have shown the coils M, Fig. 4, as operating to vary the electro-motive force of the supplemental dynamo by adjusting the brushes, I do not limit myself to this, since the separate magnet might be used as the controller-magnet for controlling the electro-motive force in any other of the ways well known in the art for regulating dynamo-electric machines.

The adjustment of the coils M on the field-magnet may be effected in any of the ways known in the art for varying the strength of an electro-magnet in an electric circuit. Thus, as shown in Fig. 7, the coils M may be cut out of or into circuit in any desired number for varying the effect of the main current. This kind of an adjustment may be found desirable for P, adjusting the action of the armature D to normal action in the combination with the other parts.

What I claim as my invention is—

1. The herein-described method of compensating for changes of load on a working-circuit supplied from a dynamo-machine, consisting in storing energy from the dynamo and upon increase of load turning the stored energy in series with that of a separate re-enforcing dynamo onto the working-circuit, in connection with that of the main dynamo, as and for the purpose described.

2. The combination, with a dynamo-machine and the working-circuit supplied thereby, of a compensating storage-battery, a supplemental re-enforcing generator in the battery-connection, and means for varying the power of such generator in accordance with fluctuations of current on the working-circuit.

3. The combination, with the compensating storage-battery, of a supplemental re-enforcing generator whose electro-motive force adds itself to that of the battery, and a controller operated by current from the circuit supplied for determining the electro-motive force of the re-enforcing generator.

4. The combination, with the storage-battery, of a re-enforcing dynamo in the circuit thereof and a regulating-coil in the main circuit for determining the re-enforcing power of the dynamo.

5. The combination, with a storage-battery, of a re-enforcing dynamo whose electro-motive force adds itself to that of the battery on the discharge of the latter and a field-magnet coil for the dynamo connected to the circuit fed from the battery.

6. The combination, with a dynamo-machine and circuit supplied therefrom, of a compensating storage-battery fed from such dynamo and a supplemental dynamo whose electro-motive force re-enforces the battery on discharge, and whose field is variable according to the fluctuations of electrical energy on the supplied circuit.

7. The combination, with a dynamo-machine and a circuit supplied thereby, of a compensating storage-battery connected across the supply mains or wires, a re-enforcing dynamo in the cross wire or connection with the storage-battery and operated constantly by a suitable power, so as to oppose the charging-current and re-enforce the discharge of the battery while the dynamo is at the same time feeding current to the main circuit and translating devices, and a field-magnet coil for the re-enforcing dynamo placed in the main circuit, as and for the purpose described.

8. The combination, with a dynamo and a circuit supplied thereby, of a compensating storage-battery, a re-enforcing dynamo for assisting the battery on discharge, and a field-magnet coil for such dynamo connected to the supplied circuit.

9. The herein-described method of regulating or re-enforcing the compensating action of a storage-battery upon a working-circuit, consisting in running a dynamo-machine in the battery branch with a polarity opposed to the charging-current and varying the electro-motive force of the dynamo in accordance with changes of electrical condition of the main or working circuit.

10. The herein-described method of regulating the compensating action of a storage-battery on a working-circuit, consisting in re-enforcing the electro-motive force of the battery on discharge and regulating the action of the re-enforcing agent by the electrical condition of the working-circuit.

11. The herein-described method of compensating for changes of electrical condition on a working-circuit supplied from a dynamo-machine, consisting in storing energy from a dynamo, turning the stored energy onto the circuit in connection with that of a separate re-enforcing dynamo, and regulating the power of the latter by the electrical condition of the working-circuit.

12. The combination, with the compensating storage-battery and the supplementary re-enforcing armature, of a differentially-wound field-magnet, one coil of which is in the circuit on which the fluctuations take place.

13. The combination, with the main-line circuit, of a dynamo in a compensating branch, an opposing field-magnet coil which tends to cut down the field magnetism of the dynamo, and an electro-responsive device controlling the circuit of said coil and responsive to fluctuations of the electrical condition of the main line, as and for the purpose described.

14. The combination, with the storage-battery and its supplemental re-enforcing generator, of a regulating-coil or electro-responsive device for the latter, a differential or opposing coil which normally opposes the main coil, and a circuit-controller for throwing said opposing coil out of action at a determinate point in a change of electrical condition on the circuit supplied.

Signed at New York, in the county of New York and State of New York, this 23d day of August, A. D. 1889.

CYPRIEN O. MAILLOUX.

Witnesses:
WM. H. CAPEL,
THOS. F. CONREY.